United States Patent
Guo et al.

(10) Patent No.: US 9,653,916 B2
(45) Date of Patent: May 16, 2017

(54) POWER SUPPLY SYSTEM AND METHOD FOR CONVERTING POWER THEREOF

(71) Applicant: DELTA ELECTRONICS, INC., Taoyuan Hsien (TW)

(72) Inventors: Xing-Kuan Guo, Taoyuan Hsien (TW); Li-Tao Xia, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 378 days.

(21) Appl. No.: 14/294,162

(22) Filed: Jun. 3, 2014

(65) Prior Publication Data
US 2014/0354051 A1    Dec. 4, 2014

(30) Foreign Application Priority Data
Jun. 4, 2013 (CN) .......................... 2013 1 0218298

(51) Int. Cl.
*H02J 1/00* (2006.01)
*B60L 8/00* (2006.01)
*B60L 11/18* (2006.01)

(52) U.S. Cl.
CPC ............... *H02J 1/00* (2013.01); *B60L 8/003* (2013.01); *B60L 11/1812* (2013.01); *B60L 11/1837* (2013.01); *B60L 11/1844* (2013.01); *B60L 2230/22* (2013.01); *B60L 2230/24* (2013.01); *B60L 2230/30* (2013.01); *Y02E 60/721* (2013.01); *Y02T 10/7005* (2013.01);
(Continued)

(58) Field of Classification Search
CPC ......... H02J 1/00; B60L 8/003; B60L 11/1812; B60L 11/1837; B60L 11/1844; B60L 2230/22; B60L 2230/30; B60L 2230/24; Y10T 307/367; Y02T 10/7005; Y02T 10/7083; Y02T 90/14; Y02T 90/127; Y02T 10/7072

USPC .......................................................... 307/26
See application file for complete search history.

(56) References Cited

U.S. PATENT DOCUMENTS

| | | | |
|---|---|---|---|
| 6,101,108 A | 8/2000 | Wittenbreder, Jr. | |
| 2013/0169204 A1* | 7/2013 | Kuboe | H02M 5/458 318/400.3 |
| 2013/0234521 A1* | 9/2013 | Eom | H02J 3/18 307/66 |

FOREIGN PATENT DOCUMENTS

| | | |
|---|---|---|
| CN | 1560988 A | 1/2005 |
| CN | 101309017 A | 11/2008 |

(Continued)

*Primary Examiner* — Rexford Barnie
*Assistant Examiner* — Toan Vu
(74) *Attorney, Agent, or Firm* — CKC & Partners Co., Ltd.

(57) ABSTRACT

A power supply system includes an input stage converting circuit, a first energy storage component, and an output stage converting circuit. The first energy storage component is electrically coupled to the input stage converting circuit, and the output stage converting circuit is electrically coupled to the first energy storage component. The input stage converting circuit is configured to charge the first energy storage component, and the first energy storage component stores charging electricity. The output stage converting circuit is configured to convert the charging electricity into output electricity and provide the output electricity to a load. The input stage converting circuit has a first electric power, and the output stage converting circuit has a second electric power greater than the first electric power. A method for converting power of the power converter is also disclosed herein.

16 Claims, 7 Drawing Sheets

(52) U.S. Cl.
CPC ........ *Y02T 10/7072* (2013.01); *Y02T 10/7083* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y04S 10/126* (2013.01); *Y10T 307/367* (2015.04)

(56) References Cited

FOREIGN PATENT DOCUMENTS

| | | | |
|---|---|---|---|
| CN | 101401277 | A | 4/2009 |
| CN | 201789415 | U | 4/2011 |
| CN | 102088198 | A | 6/2011 |
| CN | 202042922 | U | 11/2011 |
| DE | 102010062362 | A1 | 6/2012 |
| EP | 1261119 | A2 | 11/2002 |
| EP | 2450221 | A2 | 5/2012 |
| TW | 275160 | B | 5/1996 |
| TW | 200717991 | A | 5/2007 |
| WO | 2013/018167 | A1 | 2/2013 |
| WO | 2013/042166 | A1 | 3/2013 |

\* cited by examiner

POWER SUPPLY SYSTEM AND METHOD FOR CONVERTING POWER THEREOF

RELATED APPLICATIONS

This application claims priority to China Application Serial Number 201310218298.9, filed Jun. 4, 2013, which is herein incorporated by reference.

BACKGROUND

Field of Invention

The embodiment of the present invention relates generally to a circuit structure and method; more particularly, to a power supply system and method for converting power thereof.

Description of Related Art

Electric vehicles are drawing more and more interests in recent years as they are more ecologically friendly compared with traditional gasoline powered vehicles. In particular, electric buses are booming in the development of urban public transportation.

Being promising in many aspects, the energy storage and charging of electric buses still remain a challenge. One economical way is to charge the electric bus batteries when the bus stops at a station, with the intermittent charging mode featured by high charging power during a short period of time. However, this intermittent charging mode increases the burden of the power grid and may cause instability issues. Furthermore, it is difficult for integrating green energy such as solar/wind power in future systems.

There has been much effort in trying to find solutions to the aforementioned problems. Nevertheless, there is still a need to improve the existing apparatuses and techniques in the art.

SUMMARY

The following presents a simplified summary of the disclosure in order to provide a basic understanding to the reader. This summary is not an extensive overview of the disclosure and it does not identify key/critical elements of the present invention or delineate the scope of the present invention.

In view of the above, the present disclosure provides a power supply system with energy storages to continuously and constantly acquire power from grids so as to decrease power requirements of input power grids, reduce power impact to electric grids, and decrease size and production cost of the power supply system.

The present disclosure provides a power supply system and a method for converting power of the power supply system, which address the problems faced in the prior art.

One aspect of the embodiment of the present invention provides a power supply system that comprises an input stage converting circuit, a first energy storage component and an output stage converting circuit. In structure, the first energy storage component is electrically coupled to the input stage converting circuit, and the output stage converting circuit is electrically coupled to the first energy storage component. In operation, the input stage converting circuit is configured to charge the first energy storage component, the first energy storage component stores charging electricity, and the output stage converting circuit is configured to convert the charging electricity into output electricity and provide the output electricity to a load, wherein the input stage converting circuit has a first electric power, the output stage converting circuit has a second electric power greater than the first electric power.

Another aspect of the present invention is directed to a method for converting power of a power supply system, which comprises an input stage converting circuit, a first energy storage component and an output stage converting circuit. The method for converting power comprises the following steps:

charging the first energy storage component, which may store charging electricity, through the input stage converting circuit, wherein the input stage converting circuit has a first electric power; and converting the charging electricity into output electricity through the output stage converting circuit, wherein the output stage converting circuit has a second electric power greater than the first electric power; and providing the output electricity to a load.

Many of the attendant features and advantages of the present disclosure will become better understood with reference to the following detailed description.

BRIEF DESCRIPTION OF THE DRAWINGS

The invention can be more fully understood by reading the following detailed description of the embodiments, with reference made to the accompanying drawings as follows.

Figure 1:
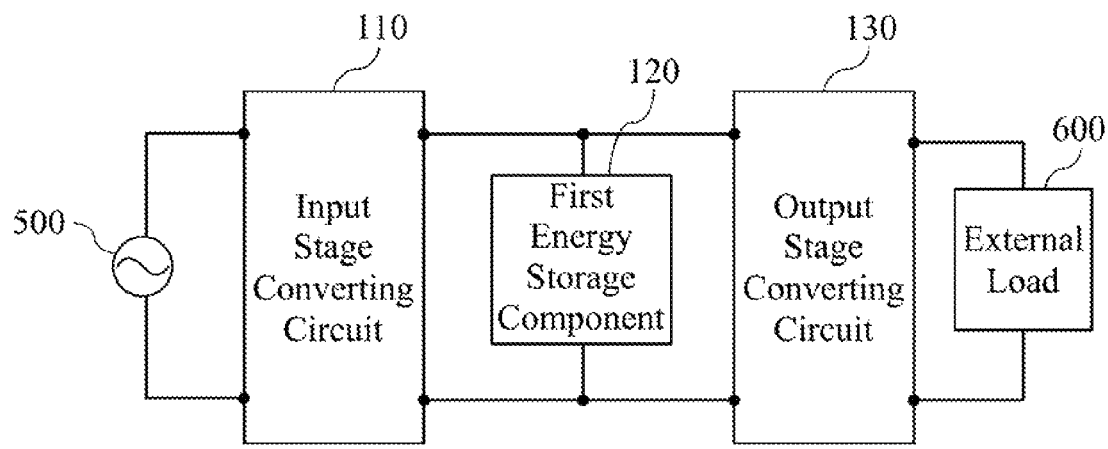
FIG. 1 schematically shows a power supply system according to one embodiment of the present invention.

In accordance with common practice, the various described features/elements are not drawn to scale but instead are drawn to best illustrate specific features/elements relevant to the present invention. Also, like reference numerals and designations in the various drawings are used to indicate like elements/parts.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise. Also, as used herein and in the claims, the terms "at least one" and "one or more" have the same meaning and include one, two, three, or more.

Moreover, as used herein, the terms "couple" or "connect" refer to the physical or electrical contacts between two or more elements with each other, either directly or indirectly, or the mutual operation or interaction between two or more elements.

To address the problems existing in the prior art, the present invention provides a power supply system which is schematically shown in FIG. 1. As illustrated in FIG. 1, the power supply system comprises an input stage converting circuit 110, a first energy storage component 120 and an output stage converting circuit 130.

The first energy storage component 120 is electrically coupled to the input stage converting circuit 110, and the output stage converting circuit 130 is electrically coupled to the first energy storage component 120.

The input stage converting circuit 110 is configured to charge the first energy storage component 120, and the first energy storage component 120 stores charging electricity. Then, the output stage converting circuit 130 converts the charging electricity into output electricity and provides the output electricity to an external load 600. The input stage converting circuit 110 has a first electric power, and the output stage converting circuit 130 has a second electric power greater than the first electric power.

For the implementation of the present disclosure, the input stage converting circuit 110 may be an AC/DC converting circuit, the first energy storage component 120 may be a rechargeable battery or a super capacitor, the output stage converting circuit 130 may be a DC/DC converting circuit, and the charging electricity may be a direct current electricity stored in the first energy storage component 120. In operation, the AC/DC converting circuit is configured to convert the three-phase alternating current from an electric grid 500 into direct current, and charge the rechargeable battery or super capacitor. Thereafter, the DC/DC converting circuit draws the direct current stored in the rechargeable battery or super capacitor, and then converts the direct current and outputs a high-power direct current such that the output electricity is provided to the external load 600. However, the present disclosure is not limited to this, and the skilled in the art may choose suitable elements for implementing the present disclosure.

Based on the above, even though the electric grid 500 may provide only a fixed alternating current, by using the input stage converting circuit 110 to convert the alternating current into a direct current and by storing the direct current in the first energy storage component 120, the output stage converting circuit 130 can convert the charging electricity stored in the first energy storage component 120 into a high-power output electricity, after which this output electricity is provided to the external load 600. In this way, the power supply system provided by the present disclosure may supply high-power output electricity as output electricity to the external load 600 without impacting the electric grid 500.

Figure 2A:
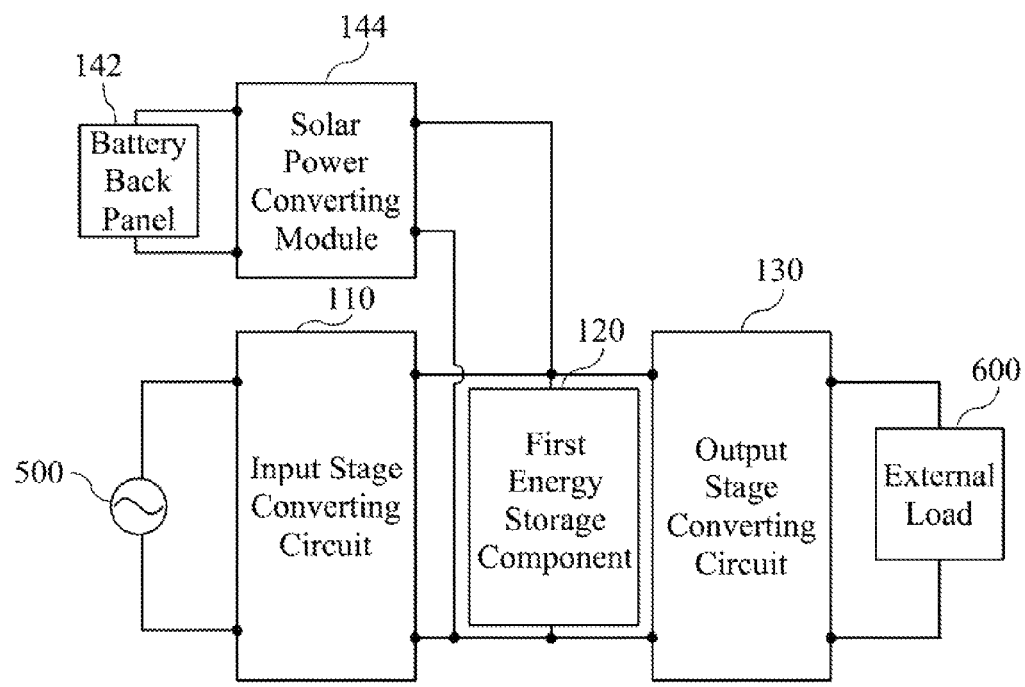
FIG. 2A schematically shows a power supply system according to another embodiment of the present invention.

FIG. 2A schematically shows a power supply system according to another embodiment of the present disclosure. In comparison with the power supply system of FIG. 1, the power supply system of FIG. 2A further comprises a solar power charging module. The input stage converting circuit 110 is configured to jointly charge the first energy storage component 120 with the solar power charging module, which includes a solar power converting module 144 and a battery back panel 142.

Figure 2B:
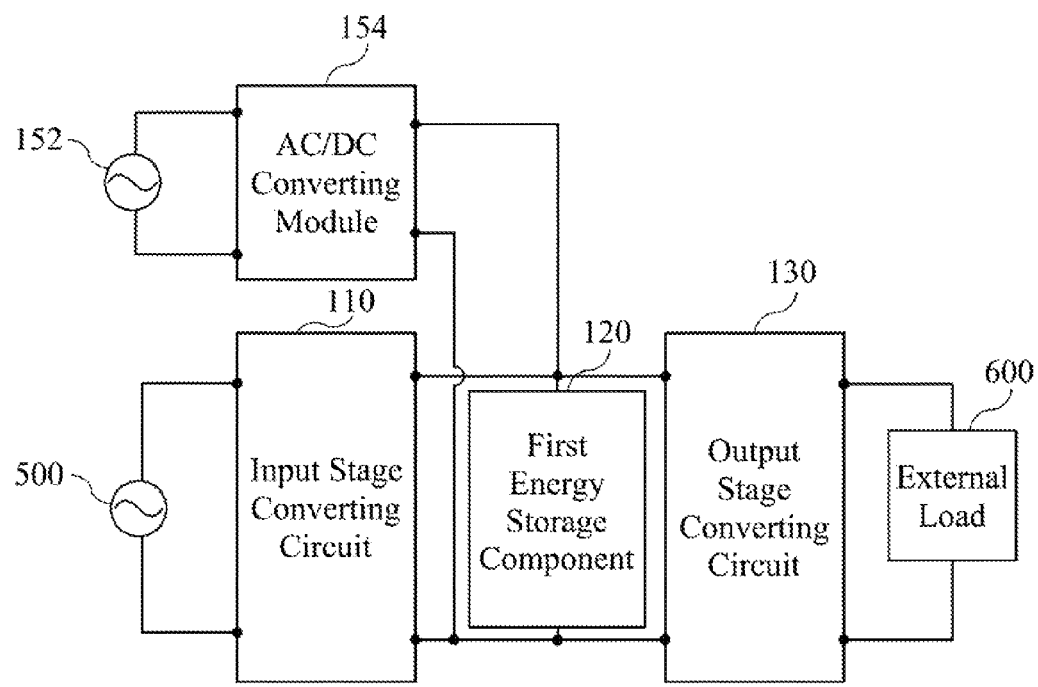
FIG. 2B schematically shows a power supply system according to yet another embodiment of the present invention.

FIG. 2B schematically shows a power supply system according to another embodiment of the present disclosure. In comparison with the power supply system of FIG. 1, the power supply system of FIG. 2B further comprises a wind power generation module or fossil fuel power generation module. The input stage converting circuit 110 is configured to jointly charge the first energy storage component 120 with the wind power generation module or fossil fuel power generation module, which includes an input source 152 and an AC/DC converting module 154.

Figure 2C:
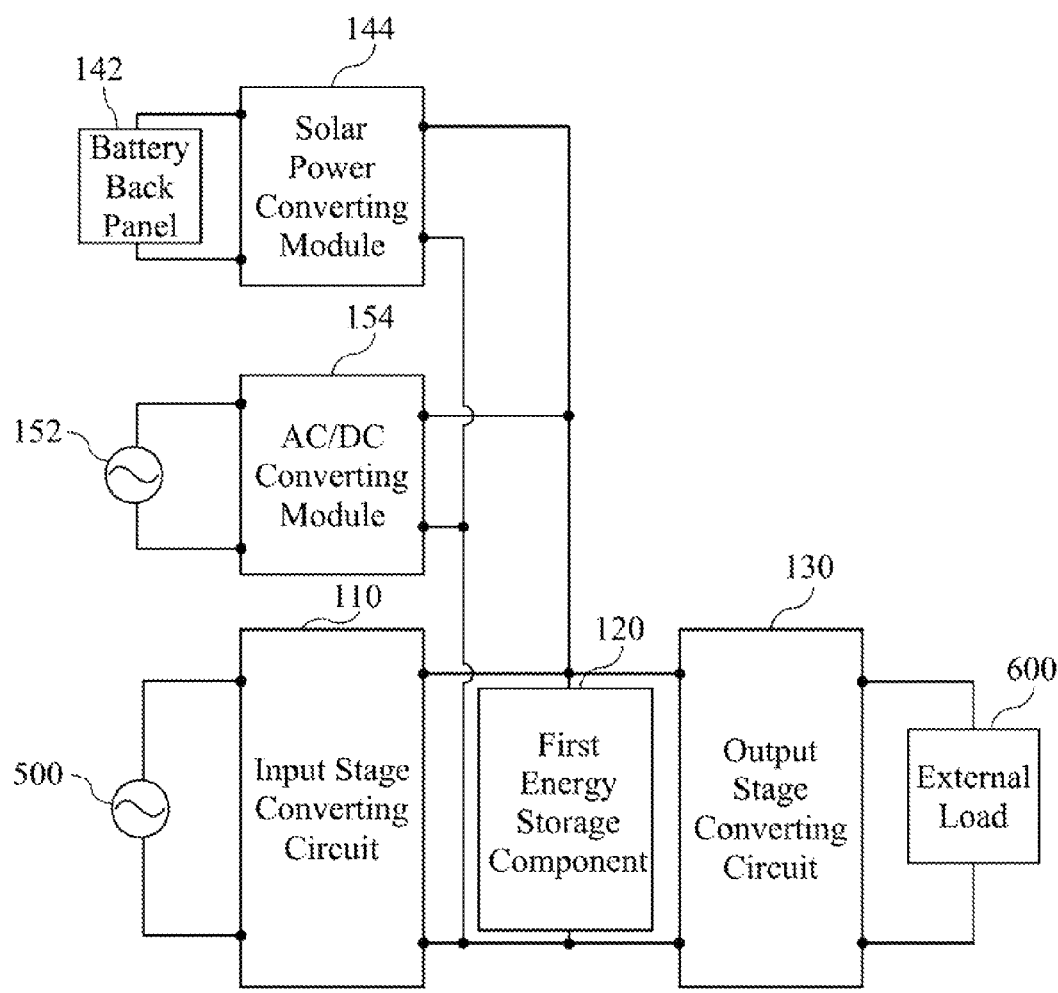
FIG. 2C schematically shows a power supply system according to still another embodiment of the present invention.

FIG. 2C schematically shows a power supply system according to another embodiment of the present invention. In comparison with the power supply system of FIG. 1, the power supply system of FIG. 2C further comprises a solar power charging module, a wind power generation module and a fossil fuel power generation module. The input stage converting circuit 110 is configured to charge the first energy storage component 120 jointly with at least two of the solar power charging module, wind power generation module and fossil fuel power generation module.

For the implementation of the present disclosure, if a high-power output stage converting circuit 130 is used, the cost would increase, and the size of the output stage converting circuit 130 would also increase. Hence, in the present disclosure, a different configuration is directed to the connection between the first energy storage component 120 and the output stage converting circuit 130 of power supply system, so as to decrease the power level of the output stage converting circuit 130. Such configuration is illustrated in FIG. 3.

Figure 3:
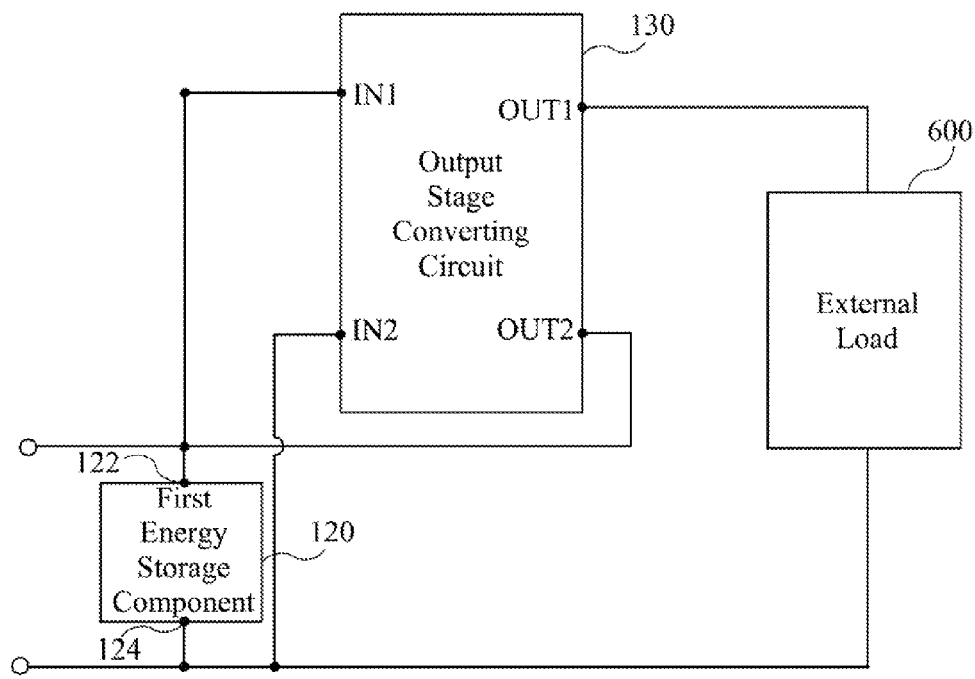
FIG. 3 schematically shows a partial circuit of a power supply system according to one embodiment of the present invention.

As illustrated in FIG. 3, the first energy storage component 120 comprises a first terminal 122 and a second terminal 124, and the output stage converting circuit 130 comprises a first input terminal IN1, a second input terminal IN2, a first output terminal OUT1 and a second output terminal OUT2. The first input terminal IN1 is electrically coupled to the first terminal 122 of the first energy storage component 120, and the second input terminal IN2 is electrically coupled to the second terminal 124 of the first energy storage component 120. Moreover, the first output terminal OUT1 is electrically coupled to one terminal of the external load 600, the second output terminal OUT2 is electrically coupled to the first terminal 122 of the first energy storage component 120, and the second terminal 124 of the first energy storage component 120 is electrically coupled to the other terminal of the external load 600.

In this way, the output portion of the output stage converting circuit is electrically coupled to the first energy storage component 120 in series; accordingly, the power converting circuit may use the output stage converting circuit 130 and the first energy storage component 120 to simultaneously charge or supply electricity to the load 600, and hence, the second electric power of the output stage converting circuit 130 may be not necessarily equal to the required power of the load 600. In fact, since the first energy storage component 120 provides a portion of the electric power, the second electric power of the output stage converting circuit 130 may be less than the required power of load 600. Hence, the power level of the output stage converting circuit 130 may be reduced, which in turn decreases the cost and size of the output stage converting circuit 130.

Specifically, the first energy storage component 120 has a third electric power, and since a portion of the power in the third electric power is used as the input power of the output stage converting circuit 130, and another portion of the power is used together with the output power of the output stage converting circuit 130 to supply power to the external load 600, the third electric power of the first energy storage component 120 is substantially equal to the required power of the external load 600.

Similarly, to further decrease the cost and size of the output stage converting circuit 130, the present disclosure further uses another different configuration in the power supply system, so as to decrease the power level of the output stage converting circuit 130. Such configuration is illustrated in FIG. 4.

Figure 4:
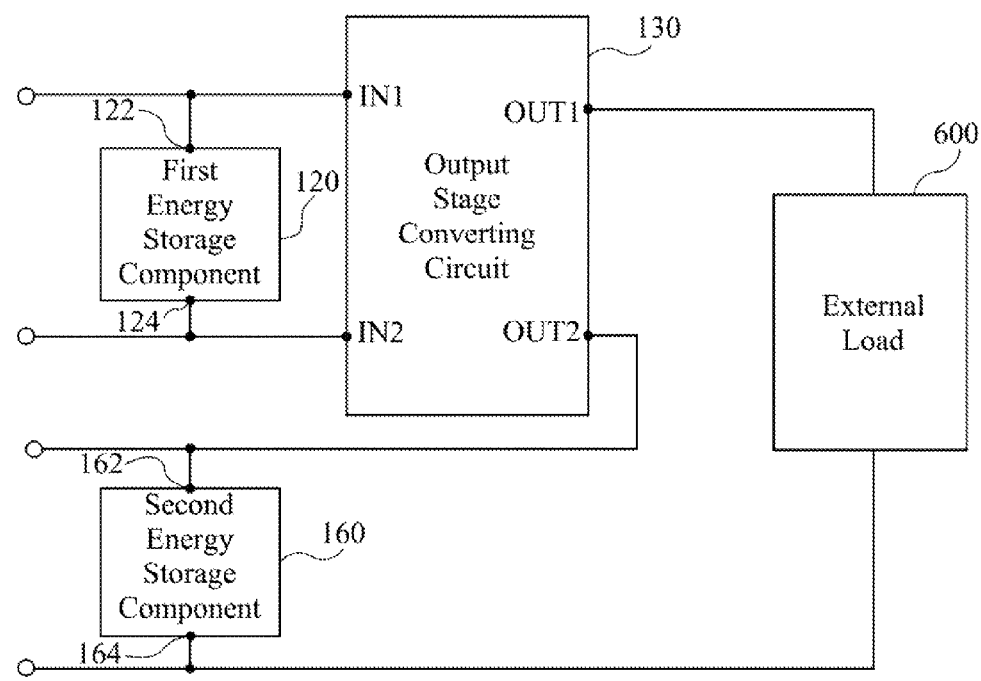
FIG. 4 schematically shows a partial circuit of a power supply system according to another embodiment of the present invention.

As illustrated in FIG. 4, the power supply system further comprises a second energy storage component 160. The second energy storage component 160 comprises first terminal 162 and a second terminal 164, and the first energy storage component 120 comprises a first terminal 122 and a second terminal 124. The output stage converting circuit 130 comprises a first input terminal IN1, a second input terminal IN2, a first output terminal OUT1 and a second output terminal OUT2. The first input IN1 is electrically coupled to the first terminal 122 of the first energy storage component 120, the second input terminal IN2 is electrically coupled to the second terminal 124 of the first energy storage component 120, the first output terminal OUT1 is electrically coupled to one terminal of the external load 600, the second output terminal OUT2 is electrically coupled to the first terminal 162 of the second energy storage component 160, and the second terminal 164 of the second energy storage component 160 is electrically coupled to the other terminal of the external load 600.

In this way, the output portion of the output stage converting circuit 130 is electrically coupled to the second energy storage component 160 in series; hence, the power converting circuit may use the output stage converting circuit 130 and the second energy storage component 160 to simultaneously charge the load 600. Consequently, the second electric power of the output stage converting circuit 130 may be not necessarily equal to the required power of the external load 600. In fact, since the second energy storage component 160 provides a portion of the electric power, the second electric power of the output stage converting circuit 130 may be less than the required power of the external load 600. Hence, the power level of the output stage converting circuit 130 may be reduced, which in turn decreases the cost and size of the output stage converting circuit 130.

Specifically, the second energy storage component 160 has a fourth electric power, and since the second electric power of the output stage converting circuit 130 and the fourth electric power of the second energy storage component 160 are used jointly to supply electricity to the external load 600, the output stage converting circuit 130 does not need to provide the required power of the external load 600 individually. Namely, the sum of the fourth electric power of the second energy storage component 160 and the second electric power of the output stage converting circuit 130 is equal to the required power of the external load 600.

Figure 5:
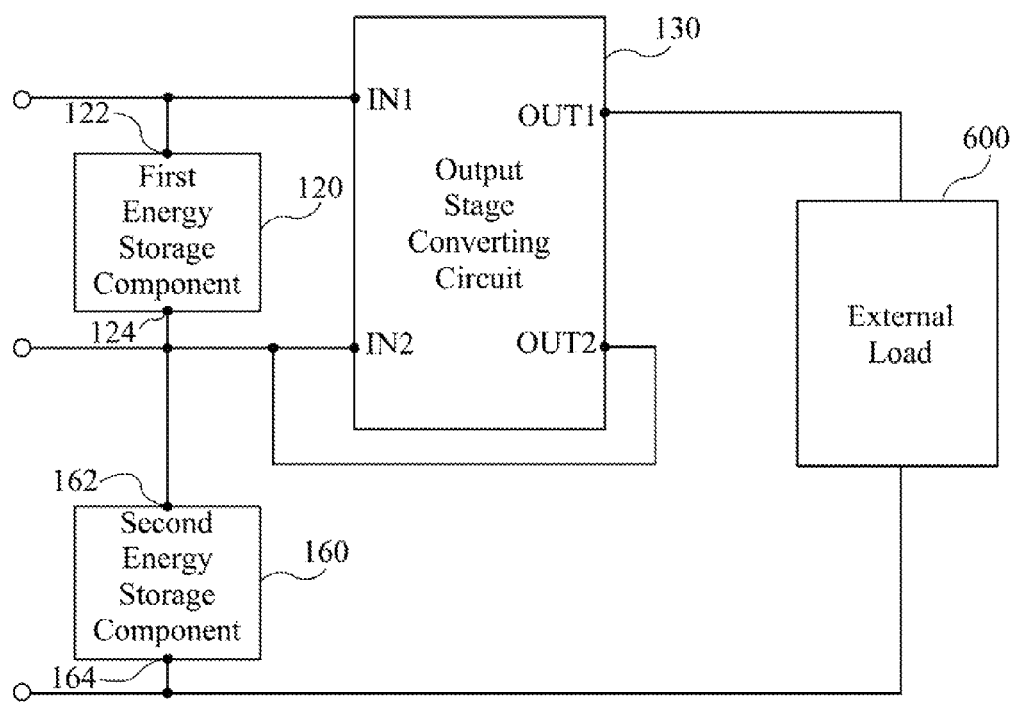
FIG. 5 schematically shows a partial circuit of a power supply system according to yet another embodiment of the present invention.

FIG. 5 schematically shows a partial circuit of a power supply system according to still another embodiment of the present disclosure. Unlike FIG. 4, the second terminal 124 of the first energy storage component 120 illustrated in FIG. 5 is electrically coupled to the first terminal 162 of the second energy storage component 160; that is, the first energy storage component 120 and the second energy storage component 160 are electrically non-isolated. Referring to FIG. 4 and FIG. 5, it is evident that the difference between these embodiments is that the first energy storage component 120 and the second energy storage component 160 are electrically isolated in the embodiment illustrated in FIG. 4.

Figure 6:
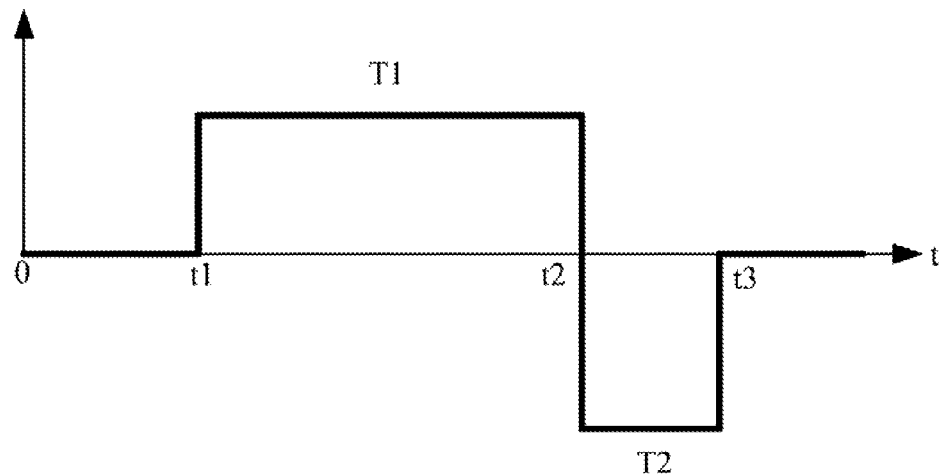
FIG. 6 schematically shows the charging power of an energy storage component of a power supply system according to still another embodiment of the present invention.
Figure 7:
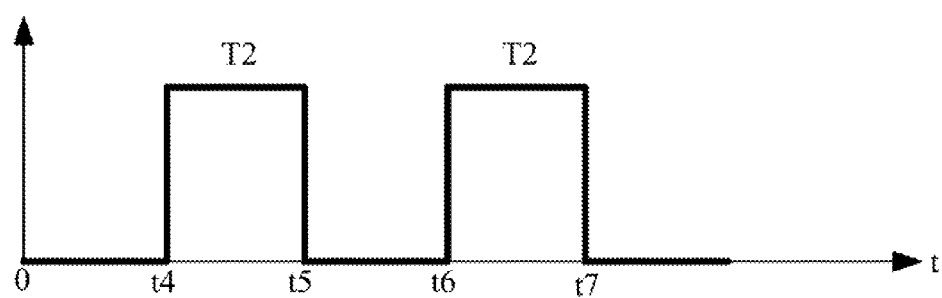
FIG. 7 schematically shows, in a power supply system, the service power of the output electricity that an output stage converting circuit provides a load according to yet another embodiment of the present invention.

To further facilitate the understanding of the principles of the present invention, reference is made to FIG. 6 and FIG. 7. FIG. 6 schematically shows the charging power of an energy storage component of a power supply system according to still another embodiment of the present disclosure. As illustrated in FIG. 6, from time point t1 to time point t2, an input stage converting circuit charges the energy storage component (the first energy storage component 120 or the second energy storage component 160), wherein the charging continues for a period of T1. Moreover, from time point t2 to time point t3, an output stage converting circuit uses the charging electricity corresponding to the energy storage component to supply electricity to an external load, wherein the supply of electricity continues for a period of T2. As can be seen in this figure, the second period T2 in which the output stage converting circuit 130 provides the output electricity to the external load 600 is less than the charging period T1 in which the input stage converting circuit 110 charges the energy storage component; that is, the power supply system of the present disclosure, by using the output stage converting circuit 130, may shorten the charging period of the external load.

FIG. 7 schematically shows, in a power supply system, the service power of the output electricity that an output stage converting circuit provides a load according to yet another embodiment of the present disclosure. As illustrated in the figure, from time point t4 to time point t5 and from time point t6 to time point t7, the output stage converting circuit 130 provides the output electricity to the load 600, in which the period of each of these time intervals is T2. As can be seen in this figure, the output stage converting circuit 130 intermittently provides the output electricity to the external load 600. In one embodiment, when the output stage converting circuit 130 discontinuously provides the output electricity to the external load 600, the input stage converting circuit 110 stops charging the first energy storage component 120.

Figure 8:
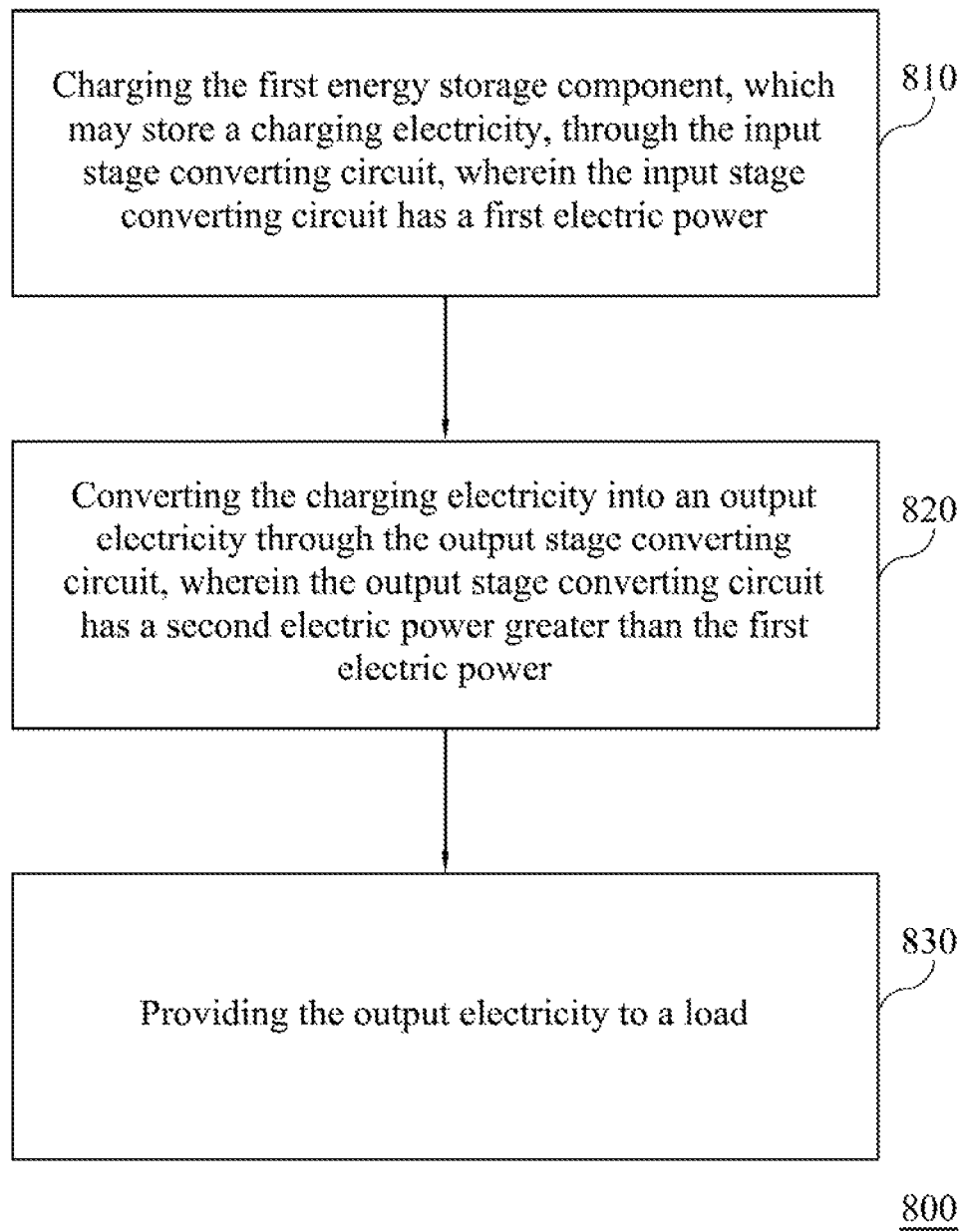
FIG. 8 is a flow diagram illustrating a method for converting power of a power supply system according to one embodiment of the present invention.

FIG. 8 is a flow diagram illustrating a method for converting power of a power supply system according to one embodiment of the present disclosure, wherein the power supply system comprises an input stage converting circuit, a first energy storage component and an output stage converting circuit. As illustrated in FIG. 8, the method 800 for converting power includes the following steps;

Step 810: charging the first energy storage component, which may store a charging electricity, through the input stage converting circuit wherein the input stage converting circuit has a first electric power;

step 820; converting the charging electricity into an output electricity through the output stage converting circuit, wherein the output stage converting circuit has a second electric power greater than the first electric power; and step 830: providing the output electricity to a load.

To facilitate the understanding of the method for converting power of the power supply system according to embodiments of the present disclosure, reference is made to both FIG. 1 and FIG. 8, which are used to describe the principles of the embodiments of the present disclosure. In step 810, the step of charging the first energy storage component 120 is implemented by using the input stage converting circuit 110. Next, in step 820, the output stage converting circuit 130 is used to convert the charging electricity into the output electricity, and the output electricity is provided to the external load 600. In step 830, the output stage converting circuit 130 is used to provide the output electricity to the external load 600.

In view of the foregoing, when the electric grid 500 can only provide a fixed alternating current, by using the first energy storage component 120 to store the charging electricity, it is possible to use the output stage converting circuit 130 to convert the charging electricity stored in the first energy storage component 120 into a high-power output electricity, after which the output electricity is provided to the external load 600. In this way, using the method 800 for converting power of the power supply system according to the present disclosure, it is possible to provide high-power output electricity for supply of the output electricity to the external load 600 without impacting the electric grid 500.

With continued reference to FIG. 1 and FIG. 8, in one embodiment, the first energy storage component 120 may be a rechargeable battery or a super capacitor. In another embodiment, referring also to FIG. 6, from time point t1 to time point t2, the energy storage component (the first energy storage component 120) is charged, wherein the charging continues for a period of T1 Moreover, from time point t2 to time point t3, the output stage converting circuit provides the output electricity to the external load 600, wherein the supply of the output electricity continues for a period of T2. As can be seen from the figure, the second period T2 is shorter than the first period T1. Further, referring also to FIG. 7, the method 800 for converting power may use the output stage converting circuit 130 to discontinuously provide the output electricity to the external load 600.

With continued reference to FIG. 1 and FIG. 8, in one embodiment, the method 800 for converting power further comprises using the at least one auxiliary charging module to charge the first energy storage component 120.

To decrease the cost and size of the output stage converting circuit 130, the method 800 for converting power according to embodiments of the present disclosure further comprises electrically coupling the first energy storage component 120 to the output terminal of the output stage converting circuit 130 in series, and then providing power supply for the load through the output stage converting circuit 130 and the first energy storage component 120 jointly, wherein the second electric power of the output stage converting circuit 130 is less than the required power of the external load 600. In this embodiment, the output power of the first energy storage component 120 is the third electric power, and the required power of the external load 600 is substantially equal to the third electric power.

In this way, the output stage converting circuit 130 only needs to provide a portion of the required power of the external load 600; hence, the power level of the output stage converting circuit 130 can be lowered, and the cost and the size of the output stage converting circuit 130 can be decreased.

Similarly, to further decrease the cost and size of the output stage converting circuit 130, the method 800 for converting power according to embodiments of the present disclosure further comprises electrically coupling the second energy storage component 160 to the output terminal of the output stage converting circuit 130 in series, and then providing power supply for the load through the output stage converting circuit 130 and the second energy storage component 160 jointly. In this embodiment, the output power of the second energy storage component 160 is the fourth electric power, and the sum of the second electric power and the fourth electric power of the second energy storage component 160 is the required power of the external load 600.

In this way, the output stage converting circuit 130 only needs to provide a portion of the required power of the external load 600; hence, the power level of the output stage converting circuit 130 can be lowered, and the cost and the size of the output stage converting circuit 130 can be decreased.

Those having skill in the art will appreciate that the method 800 for converting power of the power supply system can be performed with software, hardware, and/or firmware. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Those skilled in the art will recognize that optional aspects of implementations will typically employ optically oriented hardware, software, and or firmware.

In addition, those skilled in the art will appreciate that each of the steps of the method 800 for converting power of the power supply system named after the function thereof is merely used to describe the technology in the embodiment of the present disclosure in detail, but the present disclosure is not limited in this regard. Therefore, combining the steps of said method into one step, dividing the steps into several steps, or rearranging the order of the steps is within the scope of the embodiment in the present disclosure.

In view of the foregoing embodiments of the present disclosure, many advantages of the present disclosure are now apparent. The embodiment of the present disclosure provides a power supply system and a method 800 for converting power thereof, so as to address the problem encountered with existing electric networks, that is, an inability to provide the large charging power required to charge electric vehicles.

Specifically, by using the power supply system and a method 800 for converting power thereof according to embodiments of the present disclosure, even when the electric grid 500 can merely provide a fixed alternating current, by using the input stage converting circuit 110 to convert the alternating current into a direct current and by storing the direct current in the first energy storage component 120, the output stage converting circuit 130 can convert the charging electricity stored by the first energy storage component 120 into high-power output electricity, after which this output electricity is provided to the external load 600. In this way, the power supply system provided by the present disclosure may supply high-power output electricity as output electricity to the external load 600 without impacting the electric grid 500.

Further, since the output portion of the output stage converting circuit 130 is electrically coupled to the first energy storage component 120 in series, the power converting circuit may use the output stage converting circuit 130 and the first energy storage component 120 to simultaneously charge the load 600; hence, the power level of the output stage converting circuit 130 may be reduced, which in turn decreases the cost and size of the output stage converting circuit 130.

It will be understood that the above description of embodiments is given by way of example only and that various modifications may be made by those with ordinary skill in the art. The above specification, examples and data provide a complete description of the structure and use of exemplary embodiments of the invention. Although various embodiments of the disclosure have been described above with a certain degree of particularity, or with reference to one or more individual embodiments, those with ordinary skill in the art could make numerous alterations to the disclosed embodiments without departing from the spirit or scope of this disclosure, and the scope thereof is determined by the claims that follow.

What is claimed is:

1. A power supply system, comprising:
   an input stage converting circuit;
   a first energy storage component with a first terminal and a second terminal electrically coupled to the input stage converting circuit, wherein the input stage converting circuit is configured to charge the first energy storage component, and the first energy storage component stores charging electricity;
   a second energy storage component with a third terminal and a fourth terminal; and
   an output stage converting circuit electrically coupled to the first energy storage component, wherein the output stage converting circuit converts the charging electricity into an output electricity and provides the output electricity to a load, wherein the output stage converting circuit further comprises:
      a first input terminal electrically coupled to the first terminal of the first energy storage component;
      a second input terminal electrically coupled to the second terminal of the first energy storage component;
      a first output terminal electrically coupled to one terminal of the load; and
      a second output terminal electrically coupled to the third terminal of the second energy storage component, wherein the fourth terminal of the second energy storage component is electrically coupled to the other terminal of the load;
   wherein the input stage converting circuit has a first electric power, and the output stage converting circuit has a second electric power which is greater than the first electric power and less than the required power of the load.

2. The power supply system according to claim 1, wherein the first energy storage component is a rechargeable battery or a super capacitor.

3. The power supply system according to claim 1, wherein the input stage converting circuit charges the first energy storage component during a first period, and the output stage converting circuit provides the output electricity to the load during a second period, wherein the second period is shorter than the first period.

4. The power supply system according to claim 1, wherein the output stage converting circuit intermittently provides the output electricity to the load.

5. The power supply system according to claim 4, wherein when the output stage converting circuit intermittently provides the output electricity to the load, the input stage converting circuit stops charging the first energy storage component.

6. The power supply system according to claim 1, further comprising at least one auxiliary charging module, wherein the auxiliary charging module and the input stage converting circuit are configured to charge the first energy storage component jointly.

7. The power supply system according to claim 6, wherein the auxiliary charging module is a solar power generation module.

8. The power supply system according to claim 1, wherein the second energy storage component has a fourth electric power, and the second electric power of the output stage converting circuit and the fourth electric power of the second energy storage component are configured to provide the output electricity to the load jointly.

9. The power supply system according to claim 8, wherein when the required power of the load keeps substantially constant, the second electric power of the output stage converting circuit is correspondingly adjusted according to the fourth electric power of the second energy storage component.

10. The power supply system according to claim 1, wherein the first energy storage component and the second energy storage component are electrically isolated.

11. The power supply system according to claim 1, wherein the second terminal of the first energy storage component is electrically coupled to the third terminal of the second energy storage component.

12. A method for converting power of a power supply system, the power supply system comprising an input stage converting circuit, a first energy storage component, a second energy storage component and an output stage converting circuit, the method comprising:
   charging the first energy storage component, which may store a charging electricity, through the input stage converting circuit, wherein the input stage converting circuit has a first electric power;
   converting the charging electricity into an output electricity through the output stage converting circuit, wherein the output stage converting circuit has a second electric power greater than the first electric power;
   electrically coupling the second energy storage component to the output terminal of the output stage converting circuit in series; and
   providing power supply to a load through the output stage converting circuit and the second energy storage component jointly,
   wherein the first energy storage component has a first terminal and a second terminal electrically coupled to the input stage converting circuit, the second energy storage component has a third terminal and a fourth terminal, and the output stage converting circuit further comprises:
      a first input terminal electrically coupled to the first terminal of the first energy storage component;
      a second input terminal electrically coupled to the second terminal of the first energy storage component;
      a first output terminal electrically coupled to one terminal of the load; and
      a second output terminal electrically coupled to the third terminal of the second energy storage component, wherein the fourth terminal of the second energy storage component is electrically coupled to the other terminal of the load.

13. The method according to claim 12, wherein the first energy storage component is a rechargeable battery or a super capacitor.

14. The method according to claim 12, wherein the first energy storage component is charged during a first period, and the output stage converting circuit is used to provide the output electricity to the load during a second period, wherein the second period is shorter than the first period.

15. The method according to claim 12, wherein the step of providing the output electricity to the load comprises:
   using the output stage converting circuit to provide the output electricity to the load intermittently.

16. The method according to claim 12, further comprising:
   using at least one auxiliary charging module to charge the first energy storage component.

\* \* \* \* \*